US010095237B2

(12) United States Patent
Li et al.

(10) Patent No.: US 10,095,237 B2
(45) Date of Patent: Oct. 9, 2018

(54) DRIVERLESS VEHICLE STEERING CONTROL METHOD AND APPARATUS

(71) Applicant: Baidu Online Network Technology (Beijing) Co., Ltd., Beijing (CN)

(72) Inventors: Yajie Li, Beijing (CN); Song Zhang, Beijing (CN); Min Luo, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 51 days.

(21) Appl. No.: 15/280,449

(22) Filed: Sep. 29, 2016

(65) Prior Publication Data
US 2017/0313352 A1  Nov. 2, 2017

(30) Foreign Application Priority Data

Apr. 29, 2016  (CN) .......................... 2016 1 0280264

(51) Int. Cl.
G05D 1/02 (2006.01)
B62D 15/02 (2006.01)
G05D 1/00 (2006.01)

(52) U.S. Cl.
CPC ......... G05D 1/0274 (2013.01); B62D 15/025 (2013.01); G05D 1/0088 (2013.01); G05D 1/0212 (2013.01); G05D 1/0278 (2013.01)

(58) Field of Classification Search
CPC .. G05D 1/0212; G05D 1/0274; G05D 1/0278; G05D 1/0265; B62D 15/025
See application file for complete search history.

(56) References Cited

U.S. PATENT DOCUMENTS 4,088,939 A * 5/1978 Mitschke ............. G05D 1/0265
   180/168
4,817,000 A * 3/1989 Eberhardt ............ G05D 1/0234
   180/167

(Continued)

FOREIGN PATENT DOCUMENTS

CN  102941876 A   2/2013
CN  104460665 A   3/2015
JP  2007210497 A * 8/2007

OTHER PUBLICATIONS

Jazar, Reza N., Vehicle Dynamics: Theory and Application (Chapter 7: Steering Dynamics), 2008, Springer US, pp. 379-454 (Year: 2008).*

(Continued)

*Primary Examiner* — Behrang Badii
*Assistant Examiner* — David A Testardi
(74) *Attorney, Agent, or Firm* — Knobbe, Martens, Olson & Bear, LLP (57) ABSTRACT

The present application discloses at least a the steering control method and apparatus for a driverless vehicle. In some embodiments, the method includes: acquiring in real time a current location of a driverless vehicle; finding, on a high precision map, a curvature radius of a turn on a road at the current location; acquiring a distance between a front axle and a rear axle and an axle length of the driverless vehicle in response to finding the curvature radius; determining a rotation angle of a steering wheel of the driverless vehicle based on the curvature radius, the distance between the front axle and rear axle, and the axle length; and controlling the steering wheel of the driverless vehicle to rotate by the rotation angle. This implementation can reduce the number of times the driverless vehicle is steered, thereby improving passenger experience of the driverless vehicle.

9 Claims, 5 Drawing Sheets

(56) References Cited

U.S. PATENT DOCUMENTS

| | | | | | |
|---|---|---|---|---|---|
| 4,860,209 | A | * | 8/1989 | Sugimoto | G05D 1/0255 180/169 |
| 5,229,941 | A | * | 7/1993 | Hattori | G05D 1/0217 180/167 |
| 5,657,226 | A | * | 8/1997 | Shin | B60K 31/0008 180/167 |
| 5,661,650 | A | * | 8/1997 | Sekine | B62D 1/28 340/438 |
| 5,781,870 | A | * | 7/1998 | Okawa | G05D 1/0891 180/408 |
| 5,913,376 | A | * | 6/1999 | Takei | B60K 31/0058 180/168 |
| 5,938,704 | A | * | 8/1999 | Torii | G05D 1/0265 180/168 |
| 6,064,925 | A | * | 5/2000 | Kobayashi | G01C 21/26 701/23 |
| 8,224,525 | B1 | * | 7/2012 | Rapoport | A01B 69/007 180/204 |
| 2008/0167770 | A1 | * | 7/2008 | Macdonald | A01B 69/008 701/24 |
| 2008/0208454 | A1 | * | 8/2008 | Pesterev | G01C 21/16 701/467 |
| 2008/0275602 | A1 | * | 11/2008 | Peake | G05D 1/0212 701/25 |
| 2011/0264327 | A1 | * | 10/2011 | Nakai | B60W 30/0953 701/41 |
| 2012/0116666 | A1 | * | 5/2012 | Makela | G05D 1/0246 701/400 |
| 2013/0041549 | A1 | * | 2/2013 | Reeve | B62D 15/025 701/28 |

OTHER PUBLICATIONS

EPO machine translation of CN 104460665 (original CN document published Mar. 25, 2015) (Year: 2015).*

\* cited by examiner

DRIVERLESS VEHICLE STEERING CONTROL METHOD AND APPARATUS

CROSS REFERENCE TO RELATED APPLICATIONS

This application claims the priority of Chinese Patent Application No. 201610280264.6, entitled "Driverless Vehicle Steering Control Method and Apparatus," filed on Apr. 29, 2016, the content of which is incorporated herein by reference in its entirety.

TECHNICAL FIELD

The present application relates to the field of automotive technology, specifically to the field of driverless vehicle, and more specifically to a driverless vehicle steering control method and apparatus.

BACKGROUND

A driverless vehicle is a novel intelligent automobile, also called a "wheeled mobile robot." The driverless vehicle mainly uses a vehicle-mounted intelligent device (that is, a vehicle-mounted intelligent brain) to perform precise control, computation and analysis for various parts in the vehicle, and finally send instructions to an electronic control unit (ECU) to respectively control different devices in the driverless vehicle. In this way, fully automatic driving of the vehicle is realized, thereby achieving autonomous driving of the vehicle.

The vehicle control technology is the core technology of the driverless vehicle, mainly including several aspects such as speed control and direction control. Autonomous driving is actually to control a vehicle to simulate a driver's driving by using electronic technologies. In most of the existing direction control methods, surrounding information of a road on which the vehicle is currently located is acquired by using a vehicle-mounted camera, a laser radar, or a global positioning system (GPS), and a turning angle of the driverless vehicle is obtained through comprehensive analysis and computation on such information, requiring a large amount of computation. Particularly, image processing is involved, which further increases the amount of computation. In addition, in all such methods, tangential processing is usually performed for the curve corresponding to the road, and one steering action is performed at every point of tangency, making the passenger feel that the vehicle is steered frequently, lowering the passenger experience of the driverless vehicle.

SUMMARY

An objective of some embodiments of the present disclosure is to provide an improved driverless vehicle steering control method and apparatus, so as to solve the technical problem mentioned in the Background section.

According to a first aspect, some embodiments of the present disclosure provide a driverless vehicle steering control method, which comprises: acquiring in real time a current location of a driverless vehicle; finding, on a high precision map, a curvature radius of a turn on a road at the current location, the curvature radius being a value used for representing an arc radius of the turn on the road being greater than zero; acquiring a distance between a front axle and a rear axle and an axle length of the driverless vehicle in response to finding the curvature radius; determining a rotation angle of a steering wheel of the driverless vehicle based on the curvature radius, the distance between the front axle and rear axle, and the axle length; and controlling the steering wheel of the driverless vehicle to rotate by the rotation angle.

In some embodiments, the determining the rotation angle of the steering wheel of the driverless vehicle based on the curvature radius, the distance between the front axle and rear axle, and the axle length comprises: determining the rotation angle of the steering wheel of the driverless vehicle by using the following formula:

$$\theta = \arcsin\sqrt{\frac{4L^2}{8R^2 + 3L^2 - W^2}}$$

where L is the distance between the front axle and rear axle, W is the axle length, R is the curvature radius, and θ is the calculated rotation angle of the steering wheel of the driverless vehicle.

In some embodiments, the method further comprises: controlling the driverless vehicle to keep driving along an original direction, in response to that not finding the curvature radius.

In some embodiments, the method further comprises: presetting a curvature radius at a turn on each road on the high precision map.

In some embodiments, the finding, on the high precision map, the curvature radius of the turn in the road at the current location comprises: finding, on a local high precision map of the driverless vehicle and/or a high precision map of a cloud server providing support for the driverless vehicle, the curvature radius of the turn on the road at the current location.

In some embodiments, the acquiring in real time the current location of the driverless vehicle comprises: acquiring in real time the current location of the driverless vehicle by using a global positioning system.

According to a second aspect, some embodiments of the present disclosure provide a driverless vehicle steering control apparatus, which comprises: an acquiring unit, configured to acquire in real time a current location of a driverless vehicle; a finding unit, configured to find, on a high precision map, a curvature radius of a turn on a road at the current location, the curvature radius being a value used for representing an arc radius of the turn on the road being greater than zero; and a first control unit, configured to: acquire a distance between a front axle and rear axle and an axle length of the driverless vehicle in response to finding the curvature radius, determine a rotation angle of a steering wheel of the driverless vehicle based on the curvature radius, the distance between the front axle and rear axle, and the axle length, and control the steering wheel of the driverless vehicle to rotate by the rotation angle.

In some embodiments, the first control unit is further configured to: determine the rotation angle of the steering wheel of the driverless vehicle by using the following formula:

$$\theta = \arcsin\sqrt{\frac{4L^2}{8R^2 + 3L^2 - W^2}}$$

where L is the distance between the front axle and rear axle, W is the axle length, R is the curvature radius, and θ is the calculated rotation angle of the steering wheel of the driverless vehicle.

In some embodiments, the apparatus further comprises: a second control unit, configured to control the driverless vehicle to keep driving along an original direction, in response to not finding the curvature radius.

In some embodiments, the apparatus further comprises: a presetting unit, configured to preset a curvature radius at a turn on each road on the high precision map.

In some embodiments, the finding unit is further configured to: find, on a local high precision map of the driverless vehicle and/or a high precision map of a cloud server providing support for the driverless vehicle, the curvature radius of the turn on the road at the current location.

In some embodiments, the acquiring unit is further configured to: acquire in real time the current location of the driverless vehicle by using a global positioning system.

According to the driverless vehicle steering control method and apparatus provided by some embodiments of the present disclosure, the current location of the driverless vehicle is acquired in real time; then, the curvature radius of the turn on the road at the current location is found on the high precision map; if the curvature radius is found, the rotation angle of the steering wheel of the driverless vehicle is determined based on the curvature radius, the distance between front and rear axles, and an axle length, and the steering wheel of the driverless vehicle is controlled to rotate by said rotation angle. Therefore, some embodiments of the present disclosure effectively utilizes data about curvature radii of roads on the high precision map, and reduces the number of times of steering, thereby improving the passenger experience.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION

The present disclosure will be further described below in detail in combination with the accompanying drawings and some embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and the features in some embodiments may be combined with each other on a non-conflict basis. The present disclosure will be described below in detail with reference to the accompanying drawings and in combination with some embodiments.

Figure 1:
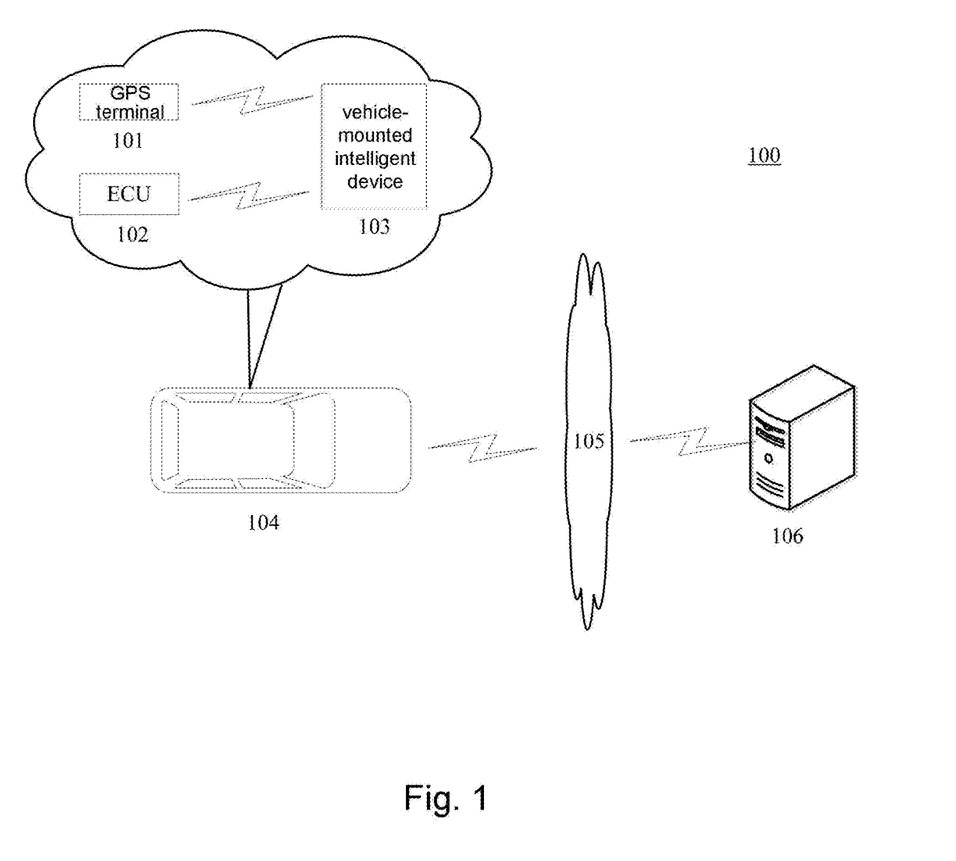
FIG. 1 is an architectural diagram of a system in which some embodiments of the present disclosure may be implemented.

FIG. 1 shows an system architecture 100 in which a driverless vehicle steering control method or a driverless vehicle steering control apparatus according to an embodiment of the present application may be implemented.

As shown in FIG. 1, the system architecture 100 may include a driverless vehicle 104, a network 105, and a cloud server 106 providing support for the driverless vehicle 104. A GPS terminal 101, an ECU 102, and a vehicle-mounted intelligent device 103 may be mounted on the driverless vehicle 104. The network 105 servers as a medium for providing a communication link between the driverless vehicle 104 and the cloud server 106. The network 105 may include various connection types, such as wired and wireless communication links, the GPS or optical fiber cables.

A control system for the driverless vehicle 104 may be installed on the vehicle-mounted intelligent device 103. The vehicle-mounted intelligent device 103 may directly interact with the cloud server 106 through the network 105. The vehicle-mounted intelligent device 103 may be further connected to the GPS terminal 101 which is used for collecting current location information of the driverless vehicle, the ECU 102 which is used for controlling various devices in the driverless vehicle, and so on.

The cloud server 106 may be a cloud server for providing data querying services, for example, a back-end network cloud server for receiving the current location information sent by the vehicle-mounted intelligent device 103 and providing a querying function. The back-end network cloud server may find, based on data such as the received current location information of the driverless vehicle, a curvature radius of a matching turn on a road, and return data about the found curvature radius of the turn on the road to the vehicle-mounted intelligent device 103.

It should be noted that the driverless vehicle steering control method provided by the embodiment of the present application is generally executed by the vehicle-mounted intelligent device 103, and accordingly, a driverless vehicle steering control apparatus is generally disposed in the vehicle-mounted intelligent device 103.

It should be appreciated that the numbers of the GPS terminals, the ECUs, the vehicle-mounted intelligent devices, the driverless vehicles, the networks, and the cloud servers in FIG. 1 are merely illustrative. Any number of GPS terminals, ECUs, vehicle-mounted intelligent devices, driverless vehicles, networks, and servers may be provided based on the implementation requirements.

Figure 2:
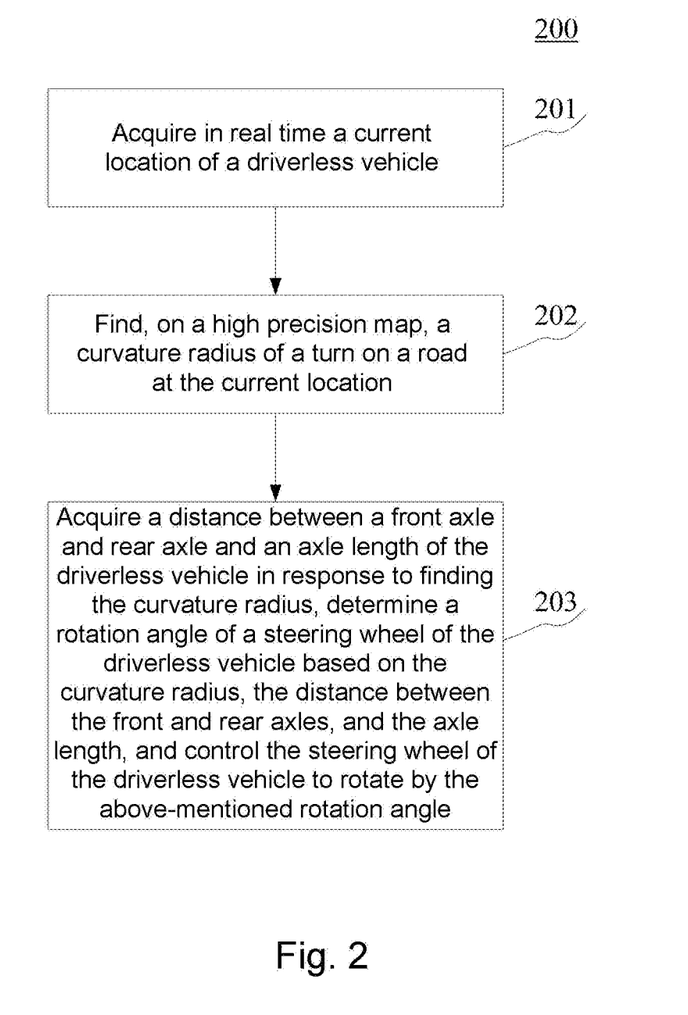
FIG. 2 is a flow chart of a driverless vehicle steering control method according to some embodiments of the present disclosure.

Further referring to FIG. 2, a flow 200 of a driverless vehicle steering control method according to an embodiment of the present application is shown. The driverless vehicle steering control method includes the following steps:

Step 201: Acquire in real time a current location of a driverless vehicle.

In this embodiment, a vehicle-mounted intelligent device (e.g., the vehicle-mounted intelligent device 103 shown in FIG. 1) on which a control system for a driverless vehicle (e.g., the driverless vehicle 104 shown in FIG. 1) is installed may acquire in real time current location information of the driverless vehicle.

In some optional implementations of this embodiment, the above-mentioned vehicle-mounted intelligent device may acquire in real time the current location of the driverless vehicle by using the global positioning system (GPS). Here, a time interval at which the acquisition is performed may be a time interval of the GPS, measured in, for example, nanoseconds, microseconds, milliseconds, or seconds; or may be a time interval defined by the vehicle-mounted intelligent device. The current location may be a location represented by longitude and latitude, or may be a location represented by a combination of longitude, latitude, and height.

Step 202: Find, on a high precision map, a curvature radius of a turn on a road at the current location.

In this embodiment, after acquiring the current location of the driverless vehicle, the above-mentioned vehicle-mounted intelligent device may find on a high precision map the curvature radius of the turn on the road at the current location. The curvature radius is a value used for representing the arc radius of the turn on the road being greater than zero.

In this embodiment, the high precision map may be a pre-generated digital map on which the turns in each road are annotated with corresponding radiuses of curvature. The data about the curvature radius may be obtained through statistically analysing and processing of the GPS data of at least one vehicle (including manned vehicles and driverless vehicles), video information recorded by a driving recorder, information about the curvature radius of the detour of the vehicle, etc., and is annotated on the high precision map.

In some optional implementations of this embodiment, the curvature radius of the turn on each road is predetermined on the high precision map. A location on a straight road or a location on a road the curvature of which is below a predetermined threshold may be ignored in annotating the radiuses of curvature in the precision map, and may not be annotated with the curvature radius. In this way, when such a location on the high precision map is checked, no corresponding curvature radius will be found. For a location on a road the curvature of which is above or equal to the above-mentioned predetermined threshold, the curvature radius of the location should be annotated on the high precision map. In this way, when such a location on the high precision map is checked, the corresponding curvature radius can be found.

In some optional implementations of this embodiment, the above-mentioned vehicle-mounted intelligent device may find, on a local high precision map of the above-mentioned driverless vehicle and/or a high precision map of a cloud server providing support for the above-mentioned driverless vehicle, the curvature radius of the turn on the road at the above-mentioned current location. Alternatively, a high precision map may be preset locally, and when a high precision map in the cloud server providing support for the above-mentioned driverless vehicle is updated, the local high precision map of the above-mentioned driverless vehicle is updated. In this way, the above-mentioned vehicle-mounted intelligent device may directly perform finding on the local high precision map, thereby improving the finding speed.

Step 203: Acquire a distance between a front axle and rear axle and an axle length of the driverless vehicle in response to finding the curvature radius, determine a rotation angle of a steering wheel of the driverless vehicle based on the curvature radius, the distance between the front and rear axles, and the axle length, and control the steering wheel of the driverless vehicle to rotate by the above-mentioned rotation angle.

In this embodiment, in case of finding the curvature radius at step 202, the above-mentioned vehicle-mounted intelligent device may acquire the distance between front and rear axles and the axle length of the driverless vehicle first. Both the distance between the front and rear axles and the axle length are intrinsic attributes of the driverless vehicle. The above-mentioned distance between the front and rear axles and the above-mentioned axle length may be stored locally in the above-mentioned driverless vehicle, so that the above-mentioned vehicle-mounted intelligent device may locally acquire the above-mentioned data and correspondingly, the acquisition speed is greater. Naturally, the above-mentioned distance between the front and rear axles and the above-mentioned axle length may be alternatively stored in a cloud server providing support for the above-mentioned driverless vehicle, so that the above-mentioned vehicle-mounted intelligent device acquires the distance between the front and rear axles and the axle length of the above-mentioned driverless vehicle remotely. Then, the above-mentioned vehicle-mounted intelligent device may determine the rotation angle of the steering wheel of the driverless vehicle based on the curvature radius found in step 202, the above-mentioned distance between the front and rear axles, and the above-mentioned axle length. Finally, the above-mentioned vehicle-mounted intelligent device controls the steering wheel of the driverless vehicle to rotate by the above-mentioned rotation angle.

In some optional implementations of this embodiment, the above-mentioned vehicle-mounted intelligent device may calculate the angle $\theta$ of rotation of the steering wheel according to an Ackermann kinematics model, $\theta = \arctan(L/R)$, where L is the distance between the front and rear axles, R is the curvature radius, and $\theta$ is the calculated rotation angle of the steering wheel.

In some optional implementations of this embodiment, the above-mentioned vehicle-mounted intelligent device may alternatively determine the rotation angle of the steering wheel of the driverless vehicle by using the following formula:

$$\theta = \arcsin\sqrt{\frac{4L^2}{8R^2 + 3L^2 - W^2}}$$

where L is the above-mentioned distance between the front and rear axles, W is the above-mentioned axle length, R is the above-mentioned curvature radius, and $\theta$ is the calculated rotation angle of the steering wheel of the above-mentioned driverless vehicle.

In this embodiment, the above-mentioned vehicle-mounted intelligent device may send data about the rotation angle of the steering wheel of the above-mentioned driverless vehicle to a steering wheel ECU. Subsequently, the steering wheel ECU controls, according to the received rotation angle of the steering wheel, the steering wheel of the above-mentioned driverless vehicle to rotate by the above-mentioned rotation angle.

According to the method provided by the above-mentioned embodiment of the present application, the curvature radius of the turn on the road at a current location of a driverless vehicle is found on a high precision map. Only when the curvature radius of the current location is already annotated on the high precision map can the curvature radius be found. A rotation angle of the steering wheel of the driverless vehicle is determined based on the above-mentioned found curvature radius, and a distance between front and rear axles and an axle length of the driverless vehicle. Finally, the steering wheel of the driverless vehicle is controlled to rotate by the above-mentioned rotation angle. The method avoids steering at every tangent point on a curve corresponding to each road, and therefore reduces the number of times of steering, thereby improving the passenger experience of the driverless vehicle.

Figure 3:
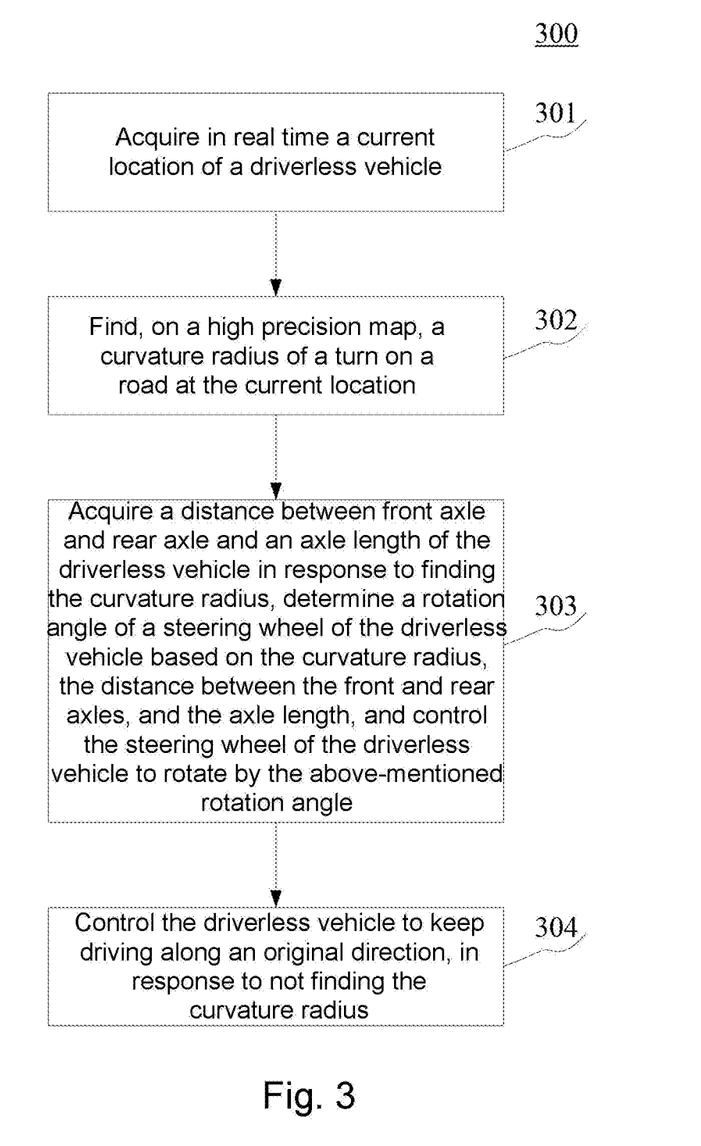
FIG. 3 is a flow chart of a driverless vehicle steering control method according to some embodiments of the present disclosure.

Further referring to FIG. 3, a flow 300 of a driverless vehicle steering control method according to another embodiment is shown. The flow 300 of the driverless vehicle steering control method includes the following steps:

Step 301: Acquire in real time a current location of a driverless vehicle.

In this embodiment, a vehicle-mounted intelligent device (e.g., the vehicle-mounted intelligent device 103 shown in FIG. 1) on which a control system for a driverless vehicle (e.g., the driverless vehicle 104 shown in FIG. 1) is installed may acquire in real time current location information of the driverless vehicle.

Step 302: Find, on a high precision map, a curvature radius of a turn on a road at the current location.

In this embodiment, after acquiring the current location of the driverless vehicle, the above-mentioned vehicle-mounted intelligent device may find on a high precision map the curvature radius of the turn on the road at the current location. The curvature radius is a value used for representing the arc radius of the turn on the road being greater than zero.

In this embodiment, the high precision map may be a pre-generated digital map on which the turns in each road are annotated with corresponding radiuses of curvature. The data about the curvature radius may be obtained through statistically analysing and processing of the GPS data of at least one vehicle, video information recorded by a driving recorder, information about a curvature radius of a detour of the vehicle, etc., and is annotated on the high precision map.

Step 303: Acquire a distance between front axle and rear axle and an axle length of the driverless vehicle in response to finding the curvature radius, determine a rotation angle of a steering wheel of the driverless vehicle based on the curvature radius, the distance between the front and rear axles, and the axle length, and control the steering wheel of the driverless vehicle to rotate by the above-mentioned rotation angle.

In this embodiment, in case of finding the curvature radius at step 302, the above-mentioned vehicle-mounted intelligent device may acquire the distance between front and rear axles and the axle length of the driverless vehicle first. Both the distance between the front and rear axles and the axle length are intrinsic attributes of the driverless vehicle. The above-mentioned distance between the front and rear axles and the above-mentioned axle length may be stored locally in the above-mentioned driverless vehicle, so that the above-mentioned vehicle-mounted intelligent device may locally acquire the above-mentioned data and correspondingly, the acquisition speed is greater. Naturally, the above-mentioned distance between the front and rear axles and the above-mentioned axle length may be alternatively stored in a cloud server providing support for the above-mentioned driverless vehicle, so that the above-mentioned vehicle-mounted intelligent device acquires the distance between the front and rear axles and the axle length of the above-mentioned driverless vehicle remotely. Then, the above-mentioned vehicle-mounted intelligent device may determine the rotation angle of the steering wheel of the driverless vehicle according to the curvature radius found in step 302, the above-mentioned distance between the front and rear axles, and the above-mentioned axle length. Finally, the above-mentioned vehicle-mounted intelligent device controls the steering wheel of the driverless vehicle to rotate by the above-mentioned rotation angle.

In this embodiment, the above-mentioned vehicle-mounted intelligent device may send data about the rotation angle of the steering wheel of the above-mentioned driverless vehicle to a steering wheel ECU. Subsequently, the steering wheel ECU controls, according to the received rotation angle of the steering wheel, the steering wheel of the above-mentioned driverless vehicle to rotate by the above-mentioned rotation angle.

Step 304: Control the driverless vehicle to keep driving along an original direction, in response to not finding the curvature radius.

In this embodiment, the above-mentioned vehicle-mounted intelligent device may control the steering wheel of the driverless vehicle not to change the direction but to keep moving along the original direction, in response to not finding the curvature radius in step 302. When the curvature radius is not found in step 302, it indicates that the current road is a straight or nearly straight road, and no steering is needed.

As can be seen from FIG. 3, compared with the embodiment corresponding to FIG. 2, the flow 300 of the driverless vehicle steering control method in this embodiment further includes step 304 of controlling the driverless vehicle to keep driving along the original direction when the curvature radius is not found. Accordingly, the solution provided by this embodiment may implement comprehensive steering control of the driverless vehicle.

Figure 4:
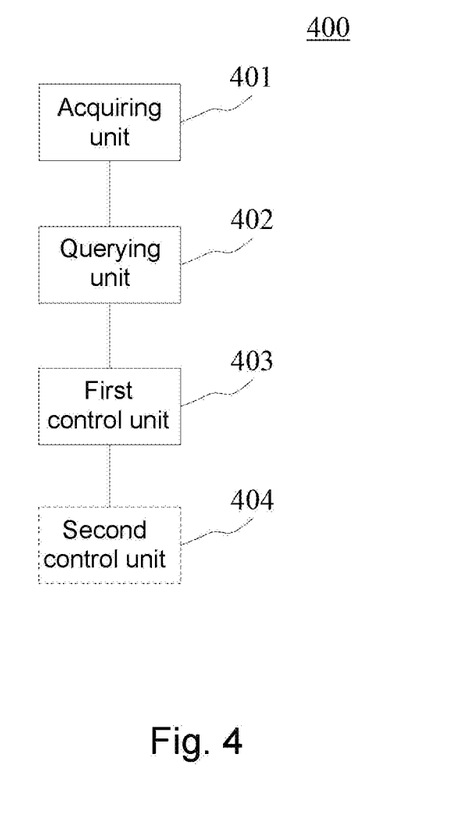
FIG. 4 is a schematic structural diagram of a driverless vehicle steering control apparatus according to some embodiments of the present disclosure.

Further referring to FIG. 4, as an implementation of the methods shown in the above-mentioned figures, the present application provides an embodiment for a driverless vehicle steering control apparatus. This apparatus embodiment corresponds to the method embodiment as shown in FIG. 2. The apparatus may be specifically applied to various electronic devices.

As shown in FIG. 4, the steering control apparatus 500 for a driverless vehicle according to this embodiment includes: an acquiring unit 401, a finding unit 402, and a first control unit 403. The acquiring unit 401 is configured to acquire in real time a current location of a driverless vehicle. The finding unit 402 is configured to find, on a high precision map, a curvature radius of a turn on a road at the above-mentioned current location, the above-mentioned curvature radius being a value used for representing an arc radius of the turn on the road being greater than zero. The first control unit 403 is configured to: acquire a distance between a front axle and rear axle and an axle length of the driverless vehicle in response to finding the curvature radius, determine a rotation angle of a steering wheel of the driverless vehicle based on the above-mentioned curvature radius, the above-mentioned distance between the front axle and rear axle, and the above-mentioned axle length, and control the above-mentioned steering wheel of the driverless vehicle to rotate by the above-mentioned rotation angle.

In this embodiment, the concrete processes of the acquiring unit 401, the finding unit 402, and the first control unit 403 in the driverless vehicle steering control apparatus 400 and the technical effects achieved thereby can refer to the related descriptions of the implementations of step 201, step 202, and step 203 in the embodiment corresponding to FIG. 2 respectively, and will not be repeated herein.

In some optional implementations of this embodiment, the first control unit 403 in the driverless vehicle steering control apparatus 400 provided by this embodiment may be further configured to: determine the rotation angle of the steering wheel of the above-mentioned driverless vehicle by using the following formula:

$$\theta = \arcsin\sqrt{\frac{4L^2}{8R^2 + 3L^2 - W^2}}$$

where L is the above-mentioned distance between the front and rear axles, W is the above-mentioned axle length, R is the above-mentioned curvature radius, and θ is the calculated rotation angle of the steering wheel of the above-mentioned driverless vehicle. The concrete processes and the technical effects achieved thereby can refer to the related description of the implementation of step 203 in the embodiment corresponding to FIG. 2, and will not be repeated herein.

In some optional implementations of this embodiment, the driverless vehicle steering control apparatus 400 that is provided by this embodiment may further include: a second control unit 404, configured to control the above-mentioned driverless vehicle to keep driving along an original direction, in response to not finding the curvature radius. The concrete process of the second control unit 404 and the technical effects achieved thereby can refer to the related description of the implementation of step 304 in the embodiment corresponding to FIG. 3, and will not be repeated herein.

In some optional implementations of this embodiment, the driverless vehicle steering control apparatus 400 that is provided by this embodiment may further include: a presetting unit (not shown in the figure), configured to preset a curvature radius at a turn on each road on the above-mentioned high precision map. The concrete process of the presetting unit and the technical effects achieved thereby can refer to the related description of the implementation of step 202 in the embodiment corresponding to FIG. 2, and will not be repeated herein.

In some optional implementations of this embodiment, the finding unit 402 in the driverless vehicle steering control apparatus 400 that is provided by this embodiment may be further configured to: find, on a local high precision map of the above-mentioned driverless vehicle and/or a high precision map of a cloud server providing support for the above-mentioned driverless vehicle, the curvature radius of the turn on the road at the above-mentioned current location. The concrete process of the finding unit 402 and the technical effects achieved thereby can refer to the related description of the implementation of step 202 in the embodiment corresponding to FIG. 2, and will not be repeated herein.

In some optional implementations of this embodiment, the acquiring unit 401 in the driverless vehicle steering control apparatus 400 that is provided by this embodiment may be further configured to: acquire in real time the current location of the driverless vehicle by using a global positioning system. The concrete process of the acquiring unit 401 and the technical effects achieved thereby can refer to the related description of the implementation of step 201 in the embodiment corresponding to FIG. 2, and will not be repeated herein.

Figure 5:
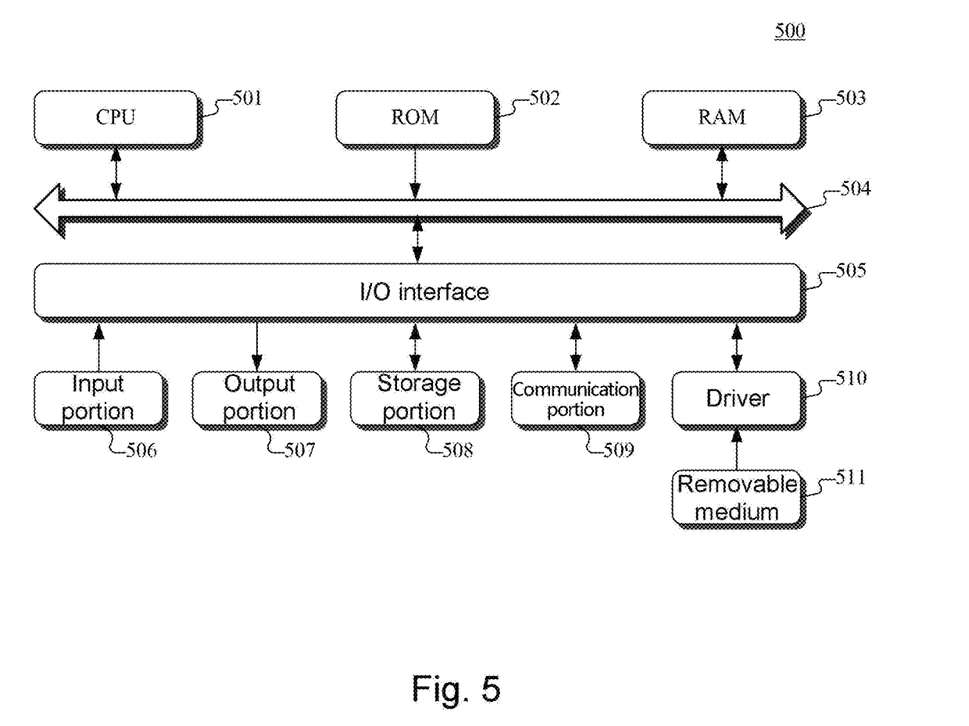
FIG. 5 is a schematic diagram of a hardware structure of a vehicle-mounted intelligent device adapted to implement some embodiments of the present disclosure.

Referring to FIG. 5, a schematic diagram of a hardware structure of a vehicle-mounted intelligent device 500 adapted to implement the embodiments of the present application is shown.

As shown in FIG. 5, the vehicle-mounted intelligent device 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising an ECU etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method as shown in the flowcharts. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present disclosure. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented byway of software or hardware. The described units may also be provided in a processor, for example, described as: a processor, comprising an acquiring unit, a finding unit and a first control unit, where the names of these units are not considered as a limitation to the units. For example, the acquiring unit may also be described as "a unit for acquiring a current location of a driverless vehicle".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to: acquiring in real time a current location of a driverless vehicle; finding, on a high precision map, a curvature radius of a turn on a road at the above-mentioned current location, the above-mentioned curvature radius being a value used for representing an arc radius of the turn on the road being greater than zero; acquiring a distance between a front axle and a rear axle and an axle length of the above-mentioned driverless vehicle in response to finding the curvature radius; determining a rotation angle of a steering wheel of the above-mentioned driverless vehicle based on the above-mentioned curvature radius, the above-mentioned distance between the front axle and rear axle, and the above-mentioned axle length; and controlling the steering wheel of the above-mentioned driverless vehicle to rotate by the above-mentioned rotation angle.

The foregoing is only a description of the embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions.

What is claimed is:

1. A driverless vehicle steering control method, comprising:
   acquiring in real time a current location of a driverless vehicle;
   finding, on a map, a curvature radius of a turn on a road at the current location, the curvature radius being a value used for representing an arc radius of the turn on the road, the curvature radius being greater than zero;
   acquiring a distance between a front axle and a rear axle and an axle length of the driverless vehicle in response to finding the curvature radius;
   determining a rotation angle of a steering wheel of the driverless vehicle based on the curvature radius, the distance between the front axle and rear axle, and the axle length; and
   controlling the steering wheel of the driverless vehicle to rotate by the rotation angle,
   wherein the determining a rotation angle of a steering wheel of the driverless vehicle based on the curvature radius, the distance between the front axle and rear axle, and the axle length comprises:
   determining the rotation angle of the steering wheel of the driverless vehicle by using the following formula:

$$\theta = \arcsin\sqrt{\frac{4L^2}{8R^2 + 3L^2 - W^2}}$$

where L is the distance between the front axle and rear axle, W is the axle length, R is the curvature radius, and θ is the calculated rotation angle of the steering wheel of the driverless vehicle.

2. The method according to claim 1, wherein the method further comprises:
   presetting a curvature radius at a turn on each road on the map.

3. The method according to claim 1, wherein the finding, on the map, the curvature radius of the turn in the road at the current location comprises:
   finding, on a local map of the driverless vehicle and/or a map of a cloud server providing support for the driverless vehicle, the curvature radius of the turn on the road at the current location.

4. The method according to claim 1, wherein the acquiring in real time the current location of the driverless vehicle comprises:
   acquiring in real time the current location of the driverless vehicle by using a global positioning system.

5. A system, comprising:
   a processor; and
   a memory coupled to the processor and storing computer readable instructions which, when executed by the processor, cause the processor to perform a driverless vehicle steering control method, the driverless vehicle steering control method comprising:
   acquiring in real time a current location of a driverless vehicle;
   finding, on a map, a curvature radius of a turn on a road at the current location, the curvature radius being a value used for representing an arc radius of the turn on the road, the curvature radius being greater than zero;
   acquiring a distance between a front axle and a rear axle and an axle length of the driverless vehicle in response to finding the curvature radius;
   determining a rotation angle of a steering wheel of the driverless vehicle based on the curvature radius, the distance between the front axle and rear axle, and the axle length; and
   controlling the steering wheel of the driverless vehicle to rotate by the rotation angle,
   wherein the determining a rotation angle of a steering wheel of the driverless vehicle based on the curvature radius, the distance between the front axle and rear axle, and the axle length comprises:
   determining the rotation angle of the steering wheel of the driverless vehicle by using the following formula:

$$\theta = \arcsin\sqrt{\frac{4L^2}{8R^2 + 3L^2 - W^2}}$$

where L is the distance between the front axle and rear axle, W is the axle length, R is the curvature radius, and θ is the calculated rotation angle of the steering wheel of the driverless vehicle.

6. The system according to claim 5, wherein the method further comprises:
   presetting a curvature radius at a turn on each road on the map.

7. The system according to claim 5, wherein the finding, on the map, the curvature radius of the turn in the road at the current location comprises:

finding, on a local map of the driverless vehicle and/or a map of a cloud server providing support for the driverless vehicle, the curvature radius of the turn on the road at the current location.

8. The system according to claim 5, wherein the acquiring in real time the current location of the driverless vehicle comprises:
   acquiring in real time the current location of the driverless vehicle by using a global positioning system.

9. A non-transitory storage medium storing one or more programs, the one or more programs when executed by an apparatus, causing the apparatus to perform a driverless vehicle steering control method, the driverless vehicle steering control method comprising:
   acquiring in real time a current location of a driverless vehicle;
   finding, on a map, a curvature radius of a turn on a road at the current location, the curvature radius being a value used for representing an arc radius of the turn on the road, the curvature radius being greater than zero;
   acquiring a distance between a front axle and a rear axle and an axle length of the driverless vehicle in response to finding the curvature radius;
   determining a rotation angle of a steering wheel of the driverless vehicle based on the curvature radius, the distance between the front axle and rear axle, and the axle length; and
   controlling the steering wheel of the driverless vehicle to rotate by the rotation angle,
   wherein the determining a rotation angle of a steering wheel of the driverless vehicle based on the curvature radius, the distance between the front axle and rear axle, and the axle length comprises:
   determining the rotation angle of the steering wheel of the driverless vehicle by using the following formula:

$$\theta = \arcsin\sqrt{\frac{4L^2}{8R^2 + 3L^2 - W^2}}$$

where L is the distance between the front axle and rear axle, W is the axle length, R is the curvature radius, and θ is the calculated rotation angle of the steering wheel of the driverless vehicle.

* * * * *